(12) United States Patent
Forster et al.

(10) Patent No.: US 7,914,880 B2
(45) Date of Patent: Mar. 29, 2011

(54) COMPOSITE ELEMENTS CONTAINING POLYISOCYANATE POLYADDITION PRODUCTS

(75) Inventors: Heinz Forster, Wolfratshausen (DE); Matthias Hefner, Erdweg (DE); Georg Knoblauch, München (DE); Jürgen Mertes, Altrip (DE); Peter Reinerth, Emmering (DE); Thomas Sandbank, München (DE); Edmund Stadler, Hollfeld (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 941 days.

(21) Appl. No.: 10/362,323

(22) PCT Filed: Aug. 16, 2001

(86) PCT No.: PCT/EP01/09436
§ 371 (c)(1),
(2), (4) Date: Feb. 20, 2003

(87) PCT Pub. No.: WO02/16460
PCT Pub. Date: Feb. 28, 2002

(65) Prior Publication Data
US 2003/0148080 A1 Aug. 7, 2003

(30) Foreign Application Priority Data
Aug. 21, 2000 (DE) .................................. 100 41 162

(51) Int. Cl.
*B32B 7/02* (2006.01)
*B32B 27/32* (2006.01)
(52) U.S. Cl. ..................... 428/212; 428/220; 428/423.1; 428/425.8; 428/457; 428/461
(58) Field of Classification Search .................. 428/625, 428/425.8, 319.1, 457, 423.1, 461, 212, 220; 427/142
See application file for complete search history.

(56) References Cited

U.S. PATENT DOCUMENTS

| | | | |
|---|---|---|---|
| 4,070,310 A * | 1/1978 | Schneider et al. | 521/129 |
| 4,256,799 A | 3/1981 | Ohashi et al. | |
| 5,778,813 A | 7/1998 | Kennedy | |
| 5,789,451 A * | 8/1998 | Guidetti et al. | 521/51 |
| 6,050,208 A * | 4/2000 | Kennedy | 114/74 A |
| 6,316,662 B1 * | 11/2001 | Woo et al. | 560/159 |
| 6,329,440 B2 * | 12/2001 | Scherzer et al. | 521/137 |
| 6,706,406 B1 * | 3/2004 | Kennedy | 428/423.1 |
| 6,770,374 B1 * | 8/2004 | Wild et al. | 428/425.8 |
| 6,790,537 B1 * | 9/2004 | Bartz et al. | 428/625 |

FOREIGN PATENT DOCUMENTS

| | | | |
|---|---|---|---|
| DE | 28 45 631 | | 4/1980 |
| DE | 19820917 | * | 11/1999 |
| DE | 198 25 083 A1 | | 12/1999 |
| DE | 198 25 084 A1 | | 12/1999 |
| DE | 198 25 085 A1 | | 12/1999 |
| DE | 198 25 087 A1 | | 12/1999 |
| DE | 198 35 727 A1 | | 2/2000 |
| DE | 199 14 420 A1 | | 10/2000 |
| DE | 19851880 | * | 11/2000 |
| WO | WO 99/64233 | | 12/1999 |
| WO | WO 99/64234 | * | 12/1999 |

OTHER PUBLICATIONS

PCT International Search Report Dated Nov. 29, 2001.
Abstract of DE-A 198 25 084, Dec. 9, 1999.
Abstract of DE-A 198 25 087, Dec. 9, 1999.
Abstract of DE-A 198 35 727, Feb. 10, 2000.
U.S. Appl. No. 09/937,788, Sep. 28, 2001.
U.S. Appl. No. 09/701,905, Dec. 5, 2000.
U.S. Appl. No. 09/701,963, Dec. 15, 2000.

* cited by examiner

*Primary Examiner* — Mark Ruthkosky
*Assistant Examiner* — Lawrence D Ferguson
(74) *Attorney, Agent, or Firm* — Howard & Howard Attorneys PLLC

(57) ABSTRACT

The invention relates to composite elements comprising the following laminar structure: (i) 2 to 20 mm metal; (ii) 10 to 100 mm polyisocyanate polyaddition products having a density ranging from 350 to 1050 kg/m$^3$ that can be obtained by reacting (a) isocyanates with (b) compounds, which are reactive to isocyanates, in the presence of (f) expanding agents, and; (iii) 2 to 20 mm metal.

17 Claims, No Drawings

COMPOSITE ELEMENTS CONTAINING POLYISOCYANATE POLYADDITION PRODUCTS

The invention relates to composite structures exhibiting the following layered structure:
(i) from 2 to 20 mm, preferably from 5 to 20 mm and more preferably from 5 to 10 mm of metal,
(ii) from 10 to 100 mm of polyisocyanate polyaddition products, usually polyurethanes, optionally exhibiting a urea and/or isocyanurate structure and having a density of from 350 to 1050 kg/m$^3$, preferably from 500 to 1050 kg/m$^3$ and more preferably from 800 to 950 kg/m$^3$, obtained by conversion of (a) isocyanates with (b) isocyanate-reactive compounds in the presence of (f) expanding agents,
(iii) from 2 to 20 mm, preferably from 5 to 20 mm and more preferably from 5 to 10 mm of metal.

The invention further relates to processes for the preparation of these composite structures and to the use thereof.

When constructing ships, for example hulls and hold covers, or bridges, rooves or multistoried buildings it is necessary to use constructional elements which are capable of withstanding considerable loads due to the action of external forces. To satisfy these requirements, such constructional elements usually consist of metal plates or metal girders reinforced by the use of appropriate geometry or suitable bracing elements. Thus hulls of tank ships are usually composed, on account of increased safety standards, of an inner hull and outer hull, of which each hull comprises 15 mm thick steel plates interconnected by ca 2 m long steel braces. Since these steel plates are exposed to considerable forces, both the outer and inner steel shells are trussed by reinforcing elements welded thereto. Disadvantages of these classical constructional elements are the considerable amount of steel required and the time-consuming and laborious building process involved. In addition, such constructional elements have a considerable weight, which lowers the tonnage of the ships and increases the fuel consumption. Furthermore, such classical constructional elements based on steel require intensive maintenance, since their external surfaces and the surfaces of the steel parts between the outer and inner shells must be regularly protected from corrosion.

A known substitute for such steel constructions are SPS (sandwich-plate system) elements, consisting of a composite of metal and plastics material. The adherence of the plastics material to the two metal layers results in composite structures showing remarkable advantages over known steel constructions. Such SPS elements are disclosed in the specifications DE-A 19,825,083, DE-A 19,825,085, DE-A 19,825,084, DE-A 19,825,087 and DE-A 19,835,727. An improvement in the manufacture of these composite structures would be, in particular, to effect control of the heat of reaction produced during manufacture of the plastics material between the metal layers and particularly to control the associated expansion of the system and subsequent shrinkage thereof during and following cooling. This should not noticeably impair the adherence of the plastics material to the metal layers or the material properties.

The concept of the present invention is thus to provide novel composite structures which exhibit excellent adherences of (ii) to (i) and (iii) both during manufacture of the plastics material and, in particular, following cooling and the associated shrinkage of (ii). The resulting composite structures should be capable of withstanding heavy loads caused by the action of external forces and be useful, for example, for building ships, bridges and multistoried buildings. The constructional elements to be provided, also referred to as composite structures, should serve as a substitute for known steel constructions and, in particular, should exhibit advantages as regards weight, manufacturing process and the amount of maintenance required.

This object is achieved in the present invention by the aforementioned composite structures.

Preference is given to composite structures exhibiting the following layered structure:
(i) from 2 to 20 mm of metal,
(ii) from 10 to 100 mm of polyisocyanate polyaddition products having a density of from 350 to 1050 kg/m$^3$, preferably from 500 to 1050 kg/m$^3$ and more preferably from 800 to 950 kg/m$^3$, obtained by conversion of (a) isocyanates with (b) isocyanate-reactive compounds in the presence of (f) expanding agents, from 1 to 50 vol, based on the volume of the polyisocyanate polyaddition products, of at least one gas (c) and, optionally, (d) catalysts and/or (e) auxiliaries and/or additives,
(iii) from 2 to 20 mm of metal.

Special preference is given to composite structures which are characterized in that (ii) exhibits a modulus of elasticity of >275 MPa over a temperature range from −45 Üd to +50° C., an adhesion to (i) and (iii) of >4 MPa, an expansion of >30 over a temperature range from −45 Üd to +50° C., a tensile strength of >20 MPa and a compressive strength of >20 MPa.

An essential feature of the invention is the fact that the polyisocyanate polyaddition products (ii) are prepared in the presence of expanding agents (f) and exhibit the density stipulated by the invention.

Suitable expanding agents (f) are any of the expanding agents conventionally used in polyurethane chemistry, for example physical and/or chemical expanding agents. Such physical expanding agents generally exhibit a boiling point under a pressure of 1 bar of greater than (ie at temperatures above) −50° C. Examples of physical expanding agents are eg FCHC, HFCHC, HFHC, aliphatic hydrocarbons, alicyclic hydrocarbons, each containing for example from 4 to 6 carbons, or mixtures of these materials, for example trichlorofluoromethane (boiling point 24° C.), chlorodifluoromethane (boiling point −40.8° C.), dichlorofluoroethane (boiling point 32° C.), chlorodifluoroethane (boiling point −9.2° C.), dichlorotrifluoroethane (boiling point 27.1° C.), tetrafluoroethane (boiling point −26.5° C.), hexafluorobutane (boiling point 24.6° C.), isopentane (boiling point 28° C.), n-pentane (boiling point 36° C.) and cyclopentane (boiling point 49° C.).

Suitable chemical expanding agents, ie expanding agents which form gaseous products when caused to react with, say, isocyanate groups, are for example water, compounds containing water of hydration, carboxylic acids, tert-alcohols, eg tert-butanol, carbamates, for example the carbamates described in specification EP-A 1,000,955, particularly on page 2, lines from 5 to 31 and also page 3, lines from 21 to 42, carbonates, eg ammonium carbonate and/or ammonium hydrogencarbonate and/or guanidine carbamate.

The chemical expanding agents (f) used are preferably water and/or carbamate(s). We particularly prefer to use water and/or carbamate(s) as (f).

Preferably the expanding agents (f) are used in an amount sufficient to give the density of (ii) required by the invention. This can be determined by simple routine experiments as are commonly known to the person skilled in the art. Particular preference is given to the use of expanding agent (f) in an amount of from 0.05 to 10 parts by weight, more preferably from 0.1 to 5 parts by weight, based on the total weight of the polyisocyanate polyaddition product.

The composite structures of the invention not only exhibit excellent mechanical properties but also, in particular, have the advantage that composite structures having very large dimensions can be produced. Such composite structures which can be obtained by synthesizing a plastics material (ii) between two metal plates (i) and (iii), have hitherto been available to a restricted extent only on account of the shrinkage of the plastics material (ii) that occurs during and after the synthesis reaction. By reason of the shrinkage of the plastics material (ii), for example the polyisocyanate polyaddition products, there occurs partial detachment of the plastics material (ii) from the metal plates (i) and/or (iii). Very good adherence of the plastics materials (ii) to the metal plates (i) and/or (iii) over the entire area thereof, as far as possible, is, however, of particular importance for the attainment of good mechanical properties of such a composite structure.

The components (c) used for the preparation of (ii) can be well known compounds having a boiling point under a pressure of 1 bar of less than (ie at temperatures lower than) −50° C., for example air, carbon dioxide, nitrogen, helium and/or neon. Preferably air is used. Component (c) is preferably inert to component (a) and more preferably to components (a) and (b), ie reactivity of the gas with (a) and (b) is detectable scarcely or, preferably, not at all. The use of gas (c) differs fundamentally from the use of conventional expanding agents for the preparation of expanded polyurethanes. While conventional expanding agents (f) are used in liquid form (or, in the case of gaseous physical expanding agents, show low partial solubility in the polyalcohol component) and during the reaction either evaporate due to temperature build-up or, in the case of water, generate gaseous carbon dioxide as a result of the reaction with isocyanate groups, the component (c) is preferably used in the present invention in the form of a gas, for example as an aerosol present in the polyalcohol component.

Preferably, the component (e) used for the preparation of (ii) is a conventional foam stabilizer, commercially available and well known to the person skilled in the art, for example a conventional polysiloxane-polyoxyalkylene block copolymer, eg Tegostab 2219 sold by Goldschmidt. The content of these foam stabilizers during manufacture of (ii) is preferably from 0.001 to 10 wt % and more preferably from 0.01 to 10 wt % and particularly from 0.01 to 2 wt %, based on the weight of the components (b), (e) and, optionally, (d) used for the preparation of (ii). The use of these foam stabilizers causes component (c) in the reaction mixture for the preparation of (ii) to be stabilized.

Synthesis of the composite structures of the invention can be carried out by creating, between (i) and (iii), polyisocyanate polyaddition products (ii), usually polyurethanes, which can optionally exhibit urea and/or isocyanurate structures, by reaction of (a) isocyanates with (b) isocyanate-reactive compounds in the presence of expanding agents (f) and preferably from 1 to 50 vol, based on the volume of the polyisocyanate polyaddition products, of at least one gas (c) and also, very preferably catalysts (d) and/or auxiliaries and/or additives (e), which polyaddition products adhere to (i) and (iii).

Preferably the reaction is carried out in a closed mold, ie (i) and (iii) are located in a mold while the starting components for the preparation of (ii) are introduced, and this mold is sealed when the introduction of said starting components is complete. Following the reaction of the starting components used for the preparation of (ii), the composite structure can be removed from the mold.

Preferably, the surfaces of (i) and/or (iii) to which (ii) adheres following manufacture of the composite structures, can be blasted with sand or steel balls. This sandblasting can take place by usual methods. For example, the surfaces can be blasted under high pressure with conventional sand and in this way cleaned and roughened for example. Suitable apparatus for such treatment is commercially available.

This treatment of the surfaces of (i) and (iii), which are in contact with (ii) after the reaction of (a) with (b), leads to a distinctly improved adherence of (ii) to (i) and (iii). Sandblasting is preferably carried out immediately before introduction of the components for the preparation of (ii) into the space between (i) and (iii). The surfaces of (i) and (iii), to which (ii) is to adhere, are preferably free from inorganic and/or organic substances which could reduce adherence, for example oil and greases or substances generally referred to as release agents.

Following this preferred treatment of the surfaces of (i) and (iii), these layers are preferably fixed in a suitable relationship to each other, for example so as to be parallel to each other. This arrangement is usually such that (i) and (iii) are spaced by a distance of from 10 to 100 mm. The fixed arrangement of (i) and (iii) can be achieved, for example, by the use of spacers. Preferably the edges of the interstices can be sealed such that the space between (i) and (iii) can be filled with (a), (b) and (f) and any other starting materials, but none of these components can leak out. Sealing can be effected using conventional plastics films or metal foils and/or metal plates, which may also serve as spacers.

The layers (i) and (iii) can be used preferably in the form of conventional metal plates, for example steel plates, having the thicknesses specified by the invention.

Filling of the space between (i) and (iii) can take place with (i) and (iii) arranged either vertically or horizontally.

Filling of the space between (i) and (iii) with (a), (b) and (f) and any other starting materials can be carried out, preferably continuously, using conventional conveyors, for example high-pressure and low-pressure machines, preferably high-pressure machines.

The delivery rate can be varied depending on the volume to be filled. In order to guarantee homogeneous curing of (ii), the delivery rate and conveyor used should be selected such that the space to be filled can be filled with the components used for the preparation of (ii) within from 0.5 to 20 min.

The layers (i) and (iii), usually plates, can be of conventional metals such as iron, conventional steel, all types of refined steel, aluminum and/or copper.

Both (i) and (ii) can be coated, for example primed, varnished and/or coated with conventional plastics materials, when used for the manufacture of the composite structures of the invention. Preference is given to uncoated (i) and (iii) and greater preference is given to layers which have been cleaned, for example, by conventional sandblasting.

The synthesis of polyisocyanate polyaddition products (ii), usually polyurethane and possibly polyisocyanurate products, particularly polyurethane elastomers, by reaction of (a) isocyanates with (b) isocyanate-reactive compounds in the presence of (f) and, optionally, catalysts (d) and/or auxiliaries and/or additives (e) and/or (c) has been described in a large number of references.

The starting materials (a), (b), (d) and (e) used in the process of the invention are described below by way of example:

Suitable isocyanates (a) are aliphatic, cycloaliphatic, araliphatic and/or aromatic isocyanates, preferably diisocyanates, which are known per se and which may have been biuretized and/or isocyanuratized by well known processes, if desired. Specifically, mention may be made of, for example: alkylene diisocyanates containing from 4 to 12 carbons in the alkylene radical, such as 1,12-dodecane diisocyanate, 2-ethyltetramethylene-1,4-diisocyanate, 2-methylpentamethylene-1,5-diisocyanate, tetramethylene-1,4-diisocyanate, lysine ester diisocyanates (LDI) and hexamethylene-1,6-diisocyanate (HDI), cyclohexane-1,3- and/or 1,4-diisocyanates, 2.4 and 2,6-hexahydrotoluylene diisocyanates and also the corresponding isomer mixture, 4,4'-, 2,2'- and 2,4'-dicyclohexylmethane diisocyanates and the corresponding isomer mixture, 1-isocyanato-3,3,5-trimethyl-5-isocyanatomethylcyclohexane (IPDI), 2,4- and/or 2,6-toluylene diisocyanates (TDI), 4,4'-, 2,4'- and/or 2,2'-diphenylmethane diisocyanates (MDI), polyphenylpolymethylene polyisocyanates and/or mixtures containing at least two of the said isocyanates. Furthermore, di- and/or poly-isocyanates containing ester, urea, allophanate, carbodiimide, uretdione and/or urethane groups can be used in the process of the invention. Preference is given to 4,4'-, 2,2'- and/or 4,4'-MDI and/or polyphenylpolymethylene polyisocyanates and more preferably mixtures containing polyphenylpolymethylene polyisocyanate and at least one of the MDI isomers.

As isocyanate-reactive compounds (b) there can be mentioned, for example, compounds having, as isocyanate-reactive groups, hydroxyl, thiol and/or primary or secondary amino groups and usually having a molecular weight of from 60 to 10,000 g/mol, eg polyalcohols selected from the group comprising the polyether polyalcohols, polyester polyalcohols, polythioether polyalcohols, hydroxyl group-containing poly(oxymethylene)s and hydroxyl group-containing aliphatic polycarbonates or mixtures of at least two of the said polyalcohols. These compounds usually have a functionality toward isocyanates of from 2 to 6 and a molecular weight of from 400 to 8000 and are well known to the person skilled in the art.

For example, suitable polyether polyalcohols are those obtained by known techniques by the addition of alkylene oxides, for example tetrahydrofuran, 1,3-propylene oxide, 1,2- or 2,3-butylene oxide, styrene oxide and preferably ethylene oxide and/or 1,2-propylene oxide, to conventional initiators. The initiators used can be, for example, known aliphatic, araliphatic, cycloaliphatic and/or aromatic compounds containing at least one, preferably from 2 to 4 hydroxyl groups and/or at least one, preferably from 2 to 4 amino groups. For example, the following initiators may be used: ethanediol, diethylene glycol, 1,2- or 1,3-propanediol, 1,4-butanediol, 1,5-pentanediol, 1,6-hexanediol, 1,7-heptanediol, glycerol, trimethylol propane, neopentyl glycol, sugars, for example sucrose, pentaerythritol, sorbit, ethylene diamine, diaminopropane, neopentanediamine, hexamethylene diamine, isophorone diamine, 4,4'-diaminodicyclohexylmethane, 2-(ethylamino)ethylamine, 3-(methylamino)propylamine, diethylene triamine, dipropylene triamine and/or N,N'-bis(3-aminopropyl)ethylene diamine.

The alkylene oxides may be used individually, successively or in admixture with each other. Preference is given to the use of alkylene oxides leading to primary hydroxyl groups in the polyalcohol. Particular preference is given to the use of polyalcohols which have alkoxylated with ethylene oxide on termination of the alkoxylation and thus contain primary hydroxyl groups.

Suitable polyester polyols can be produced, for example, from organic dicarboxylic acids containing from 2 to 12 carbons, preferably aliphatic dicarboxylic acids containing from 4 to 6 carbons, and polyhydroxylic alcohols, preferably diols containing from 2 to 12 carbons, preferably from 2 to 6 carbon atoms. The polyester polyols preferably have a functionality of from 2 to 4 and more preferably from 2 to 3, and a molecular weight of from 480 to 3000, preferably from 600 to 2000 and more preferably from 600 to 1500.

The composite structures of the invention are preferably manufactured using polyether polyalcohols as component (b) for reaction with the isocyanates, advantageously polyether polyols having an average functionality toward isocyanates of from 1.5 to 8 and preferably from 2 to 6 and a molecular weight of from 400 to 8000.

The use of polyether polyalcohols offers considerable advantages over the use of polyester polyalcohols, since the polyisocyanate polyaddition products show better resistance to hydrolytic cleavage and their viscosity is lower. The improved resistance to hydrolysis is particularly advantageous for use in shipbuilding. The lower viscosity of the polyether polyalcohols and the reaction mixture for the preparation of (ii) containing the polyether polyalcohols allows for quicker and simpler filling of the space between (i) and (iii) with the reaction mixture employed for preparation of the composite structures. As the dimensions in particular of constructional elements for shipbuilding are considerable, low-viscosity liquids are of considerable advantage.

Other substances suitable for use as isocyanate-reactive compounds are those exhibiting a hydrocarbon skeleton containing from 10 to 40 carbons and from 2 to 4 isocyanate-reactive groups. By the expression "hydrocarbon skeleton" we mean an uninterrupted sequence of carbon atoms which are not interspersed with oxygen atoms, as is the case with ethers. Examples of such substances, referred to below as (b3), there may be mentioned castor oil and derivatives thereof.

Furthermore, as isocyanate-reactive compounds there can be used, in the process of the invention, not only the above compounds having a conventional molecular weight of from 400 to 8000 but also, optionally, diols and/or triols having molecular weights of from 60 to <400, as chain-extending and/or crosslinking agents. In order to modify the mechanical properties, eg hardness, it may prove to be advantageous to add chain-extenders, crosslinking agents or, if desired, mixtures thereof. The chain-extending and/or crosslinking agents preferably have a molecular weight of from 60 to 300. Suitable compounds are for example aliphatic, cycloaliphatic and/or araliphatic diols containing from 2 to 14 and preferably from 4 to 10 carbon atoms, such as ethylene glycol, 1,3-propanediol, 1,10-decanediol, o-, m- and p-dihydroxycyclohexanes, diethylene glycol, dipropylene glycol and preferably 1,4-butanediol, 1,6-hexanediol and bis(2-hydroxyethyl)hydroquinone, triols, such as 1,2,4- and 1,3,5-trihydroxycyclohexanes, glycerol and trimethylol propane, low-molecular hydroxyl group-containing polyalkylene oxides based on ethylene oxide and/or 1,2-propylene oxide and the aforementioned diols and/or triols as primers and/or diamines such as diethyltoluenediamine and/or 3,5-dimethylthio-2,4-toluenediamine.

If chain-extenders, crosslinking agent or mixtures thereof are used for the preparation of the polyisocyanate polyaddition products, they are advantageously used in amounts of from 0 to 30 wt % and preferably from 1 to 30 wt %, based on the weight of the total weight of isocyanate-reactive compounds (b) used.

In addition, aliphatic, araliphatic, cycloaliphatic and/or aromatic carboxylic acids can be used as (b) for optimizing the process of curing during manufacture of (ii). Examples of such carboxylic acids are formic acid, acetic acid, succinic acid, oxalic acid, malonic acid, glutaric acid, adipic acid, citric acid, benzoic acid, salicylic acid, phenylacetic acid, phthalic acid, toluenesulfonic acid, derivatives of said acids, isomers of said acids and arbitrary mixtures of said acids. The percentage by eight of these acids can be from 0 to 5 wt % and preferably from 0.2 to 2 wt %, based on the total weight of (b).

Preferably, there is used, as (b), a mixture containing:
(b1) from 40 to 99 wt % of polyether polyalcohol having an average functionality of from 1.5 to 2.99 and an average molecular weight of from 400 to 8000 and
(b2) from 1 to 60 wt % of polyether polyalcohol having an average functionality of from 3 to 5 and an average molecular weight of from 150 to 8000, the percentages being by weight of the total mixture.

Particularly preferably, there is used, as (b), a mixture containing:
(b1) from 40 to 98 and preferably from 50 to 80 wt % of polyether polyalcohol having an average functionality of from 1.9 to 3.2, preferably from 2.5 to 3, and an average molecular weight of from 2500 to 8000,
(b2) from 1 to 30 and preferably from 10 to 25 wt % of polyether polyalcohol having an average functionality of from 1.9 to 3.2, preferably from 2.5 to 3, and an average molecular weight of from 150 to 399 and
(b3) from 1 to 30 and preferably from 10 to 25 wt % of at least one aliphatic, cycloaliphatic and/or araliphatic diol containing from 2 to 14 and preferably from 4 to 10 carbons, the percentages being by weight of the total mixture.

Preferably the ratio, by weight, of polyether polyalcohols to polyester polyalcohols in component (b) is >100 and more preferably >1000, but particular preference is given to the use of no polyester polyalcohols as component (b) for the preparation of (ii).

The curing properties of the reaction mixture may also be improved by using amine-initiated polyether polyalcohols for the preparation of (ii).

The catalysts (d) used can be well known compounds which considerably accelerate the reaction of isocyanates with the isocyanate-reactive compounds, preference being given to the use of a total catalyst concentration of from 0.001 to 15 wt % and particularly from 0.05 to 6 wt %, based on the total weight of isocyanate-reactive compounds used. For example, the following compounds can be used: triethylamine, tributylamine, dimethylbenzylamine, dicyclohexylmethylamine, dimethylcyclohexylamine, N,N,N',N'-tetramethyldiaminodiethylether, bis(dimethylaminopropyl) urea, N-methyl- or N-ethyl-morpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, dimethylpiperazine, N-dimethylaminoethylpiperidine, 1,2-dimethylimidazol, 1-azabicyclo-(2,2,0)-octane, 1,4-diazabicyclo-(2,2,2)-octane (Dabco) and alkanolamine compounds, such as triethanolamine, triisopropanolamine, N-methyl and N-ethyl-diethanolamines, dimethylaminoethanol, 2-(N,N-dimethylaminoethoxy)ethanol, N,N',N"-tris(dialkylaminoalkyl) hexahydrotriazines, eg N,N',N"-tris(dimethylaminopropyl)-s-hexahydrotriazine, iron(II) chloride, zinc chloride, lead octoate and preferably tin salts, such as tin dioctoate, diethyltin hexoate, dibutyltin dilaurate and/or dibutyldilauryltin mercaptide, 2,3-dimethyl-3,4,5,6-tetrahydropyrimidine, tetraalkylammoniumhydroxides, such as tetramethylammoniumhydroxide, alkali hydroxides, such as sodium hydroxide, alkali alkoxides, such as sodium methylate and potassium isopropylate, and/or alkali metal salts of long-chain fatty acids containing from 10 to 20 carbons and optionally pendant OH groups.

It has been found to be very advantageous to carry out the synthesis of (ii) in the presence of (d), in order to accelerate the reaction.

Auxiliaries and/or additives (e) are optionally incorporated in the reaction mixture used for preparation of polyisocyanate polyaddition products (ii). Specific examples are fillers, surface-active substances, dyes, pigments, flameproofing agents, antihydrolysis agents, fungistatic, bacteriostatically effective substances and foam stabilizers.

Examples of suitable surface-active substances are compounds which assist homogenization of the starting materials and which may also be suitable for controlling the structure of the plastics materials. Specific examples are emulsifiers, such as the sodium salts of ricinoleic sulfates or of fatty acids and also salts of fatty acids with amines, eg oleate of diethylamine, stearate of diethanolamine, ricinoleate of diethanolamine, salts of sulfonic acids, eg alkali metal or ammonium salts of dodecylbenzenedisulfonic acid or dinaphthylmethanedisulfonic acid and ricinoleic acid. The surface-active substances are usually employed in amounts of from 0.01 to 5 wt %, based on 100 wt % of the total isocyanate-reactive compounds (b) used.

Suitable flameproofing agents are for example tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl)ethylene diphosphate, dimethylmethane phosphonate, ethyl diethanolaminomethylphosphonate and also commercial halogen-containing flame-protecting polyalcohols. In addition to the aforementioned halogen-substituted phosphates there may be used inorganic or organic flameproofing agents such as red phosphorus, hydrous aluminum oxide, antimony trioxide, arsenic oxide, ammonium polyphosphate and calcium sulphate, exfoliated graphite or cyanuric derivatives such as melamine, or mixtures of at least two flameproofing agents such as ammonium polyphosphates and melamine and, if desired, maize starch or ammonium polyphosphate, melamine and exfoliated graphite and/or optionally aromatic polyesters, for the purpose of flameproofing the polyisocyanate polyaddition products. We have found that it is generally advantageous to use from 5 to 50 wt % and preferably from 5 to 25 wt % of said flameproofing agents, based on the total weight of isocyanate-reactive compounds used.

By fillers, particularly the more effective fillers, we mean conventional organic and inorganic fillers, reinforcing agents, loading agents, agents for improving the abrasion characteristics of paints, coating compositions, etc. Specific examples thereof are inorganic fillers such as siliceous minerals, for example lamellar silicates such as antigorite, serpentine, hornblendes, amphiboles, chrisotile and talcum powder, metal oxides, such as kaolin, aluminum oxides, titanium oxides and iron oxides, metal salts, such as chalk, heavy spar and inorganic pigments, such as cadmium sulphide and zinc sulfide, and also glass etc. Preferably used are kaolin (China clay), aluminum silicate and co-precipitates of barium sulphate and aluminum silicate and also natural and synthetic fibrous minerals such as wollastonite and metallic and glass fibers of short length. Suitable organic fillers are for example: coal, melamine, colophony, cyclopentadienyl resins and graft polymers and also cellulose fibers and fibers of polyamide, polyacrylonitrile, polyurethane or polyester on the basis of aromatic and/or aliphatic dicarboxylates and particularly carbon fibers. The inorganic and organic fillers can be used individually or in the form of mixtures.

During manufacture of (ii) there is preferably used from 10 to 70 wt % of fillers, based on the weight of (ii), as auxiliaries and/or additives (e). The fillers preferably used are talcum powder, kaolin, calcium carbonate, heavy spar, glass fibers and/or glass microglobules. The size of the particles of filler is preferably such that they form no hindrance to the process of filling the components for preparation of (ii) into the space between (i) and (iii). Particular preference is given to fillers having particle sizes of <0.5 mm.

The fillers are preferably used in admixture with the polyalcohol component used in the reaction forming the polyisocyanate polyaddition products.

The fillers may serve the purpose of reducing the coefficient of thermal expansion of the polyisocyanate polyaddition products (which is greater than that of steel) to make it equal to that of steel. This is particularly advantageous for creating a durable strong bond between the layers (i), (ii) and (iii), since it reduces the stresses which occur between the layers under thermal load.

The weight of (ii) corresponds, per definition, to the weight of the components (a), (b) and (c) and optionally (d) and/or (e) used for the preparation of (ii).

In order to prepare the polyisocyanate polyaddition products of the invention, the isocyanates and the isocyanate-reactive compounds are caused to react in proportions such that the equivalent ratio of NCO groups in isocyanates (a) to the sum of the reactive hydrogen atoms in the isocyanate-reactive compounds (b) and optionally (f) is from 0.85 to 1.25:1, preferably from 0.95 to 1.15:1 and more preferably from 1 to 1.05:1. If (ii) contain at least some attached isocyanurate groups, there is usually used a ratio of NCO groups to the sum of the reactive hydrogen atoms of from 1.5 to 60:1 and preferably from 1.5 to 8:1.

The polyisocyanate polyaddition products are usually prepared by the one-shot method or by the prepolymer process, employing, for example, high-pressure or low-pressure techniques.

We have found it to be particularly advantageous to operate by a two-component process and to combine or preferably intimately intermix the isocyanate-reactive compounds (b), expanding agents (f) and optionally catalysts (d) and/or auxiliaries and/or additives (e) to form component (A) and to use isocyanates (a) as component (B).

Component (c) can be fed to the reaction mixture containing (a), (b), (f) and optionally (d) and/or (e) and/or to the individual components (a), (b), (A) and/or (B) described above. The component which is mixed with (c) is usually present in liquid form. Preferably the components are mixed to form component (b).

Mixing of the appropriate component with (c) can take place by well known techniques. For example (c) can be fed to the appropriate component through, say, a nozzle using well known feeding equipment, for example hydraulic feeding equipment, preferably under pressure, for example from a pressure vessel or compressed by a compressor. Preferably the corresponding components are well mixed with (c), so that gas bubbles of (c) in the normally liquid component have a size of preferably from 0.0001 to 10 and more preferably from 0.0001 to 1 mm.

The content of (c) in the reaction mixture used for preparation of (ii) can be determined by measuring the density of the reaction mixture in the return pipe of the high-pressure machine using well known measuring devices. The content of (c) in the reaction mixture can be regulated on the basis of this density, preferably automatically, by a control unit. The component density can be determined and regulated on-line during usual recirculation of the material in the machine at normal or very low circulation rates.

The sandwich element can be prepared, for example, by sealing the space between (i) and (iii) which is to be filled with the starting components for the preparation of (ii), except for an inlet and outlet for the starting components, and pouring in the starting components (a), (b), (f) and optionally (c), (d) and/or (e), preferably intermixed, through the inlet into the space between (i) and (iii), preferably by means of a conventional high-pressure machine.

The starting components are usually mixed at a temperature of from 0° to 100° C. and preferably from 20° to 60° C. and introduced as described above into the space between (i) and (iii). Blending can be carried out mechanically by means of a stirrer or a spiral stirrer, but is preferably effected using the countercurrent principle normally employed in high-pressure machines, in which the component A stream and component B stream impinge on each other and mix in the mixing head under high pressure, the stream of each component being split if desired. The reaction temperature, ie the temperature at which conversion is effected, is usually >20° C. and preferably from 50° to 150° C.

Polyisocyanate polyaddition products (ii) of the composite structures manufactured by the process of the invention exhibit preferably a modulus of elasticity of >275 MPa over a temperature range of from −45 Üd to +50° C. (according to DIN 53,457), a degree of adherence to (i) and (iii) of >4 MPa (according to DIN 53,530), elongation of >30% over a temperature range of from −45 Üd to +50° C. (according to DIN 53,504), a tensile strength of >20 MPa (according to DIN 53,504) and a compressive strength of >20 MPa (according to DIN 53,421).

The composite structures of the invention as produced by the process of the invention have the following advantages over known constructions:

The use of expanding agents (f) causes less shrinkage when the system cools following the reaction, compared with polyurethanes of higher densities. Thus better adherence to (i) and (iii) is achieved, since detachment during cooling is avoided.

The preferred use of (c) can additionally avoid shrinkage of (ii) to improve the adherence of (ii) to (i) and (iii).

Accordingly, the composite structures produced by the process of the invention are used primarily in fields in which constructional elements are required to withstand large forces, for example as constructional elements in shipbuilding, eg for hulls, for example double hulls of ships having an outer and an inner wall, and hold covers, or in building structures such as bridges, or as constructional elements for houses, particularly multistoried buildings.

The composite structures of the invention are not to be confused with classical sandwich elements containing a rigid foam of polyurethane and/or polyisocyanurate as core and usually employed for thermal insulation. Such known sandwich elements would be unsuitable for the said fields of application on account of their comparatively low mechanical stability.

The invention claimed is:

1. A composite structure comprising the following layered structure:
   (i) from 2 to 20 mm of metal,
   (ii) from 10 to 100 mm of a polyisocyanate polyaddition product having a density of from 350 to 1050 kg/m$^3$ comprising the reaction product of (a) an isocyanate and (b) an isocyanate-reactive compound in the presence of (f) an expanding agent present in an amount of from 0.05 to 10 parts by weight based on the weight of said polyisocyanate polyaddition product, and
   (iii) from 2 to 20 mm of metal;
   wherein said (ii) polyisocyanate polyaddition product is disposed between said (i) and (iii) and in contact with at least one of said (i) and (iii); and wherein surfaces of at least one of said (i) and (iii), which are in contact with said (ii), are free from inorganic and/or organic substances other than said (ii).

2. A composite structure as defined in claim 1 containing, as expanding agent (f), water and/or carbamate.

3. A composite structure as defined in claim 1 wherein said expanding agent is present in an amount of from 0.1 to 5 parts by weight based on the weight of said polyisocyanate polyaddition product.

4. A composite structure as defined in claim 1 wherein said expanding agent comprises a chemical expanding agent.

5. A composite structure as defined in claim 4 wherein said chemical expanding agent comprises a carbamate.

6. A composite structure as defined in claim 1 wherein said expanding agent comprises a physical expanding agent.

7. A composite structure as defined in claim 1 wherein said (ii) polyisocyanate polyaddition product is in contact with both said (i) and (iii).

8. A composite structure comprising the following layered structure:
  (i) from 2 to 20 mm of metal,
  (ii) from 10 to 100 mm of a polyisocyanate polyaddition product having a density of from 350 to 1050 kg/m$^3$ and comprising the reaction product of (a) an isocyanate and (b) an isocyanate-reactive compound in the presence of (f) an expanding agent present in an amount of from 0.05 to 10 parts by weight based on the weight of said polyisocyanate polyaddition product, and from 1 to 50 vol %, based on the volume of the polyisocyanate polyaddition product, of at least one gas (c) and, optionally, (d) a catalyst and/or (e) an auxiliary and/or additive, and
  (iii) from 2 to 20 mm of metal;
  wherein said (ii) polyisocyanate polyaddition product is disposed between said (i) and (iii) and in contact with at least one of said (i) and (iii); and wherein surfaces of at least one of said (i) and (iii), which are in contact with said (ii), are free from inorganic and/or organic substances other than said (ii).

9. A composite structure as defined in claim 8 containing a foam stabilizer as (e).

10. A composite structure as defined in claim 1 or claim 8, wherein at least one polyether polyol is used as (b).

11. A composite structure as defined in claim 8, wherein (ii) contains from 10 to 70 wt % of a filler, based on the weight of (ii), as (e) auxiliary and/or additive.

12. A composite structure as defined in claim 1 or claim 8, wherein (ii) exhibits a modulus of elasticity of >275 MPa over a temperature range of from −45° to +50° C., an adhesive power toward (i) and (iii) of >4 MPa, an extension of >30% over a temperature range of from −45° to +50° C., a tensile strength of >20 MPa and a compressive strength of >20 MPa.

13. A composite structure as defined in claim 8 wherein said expanding agent is present in an amount of from 0.1 to 5 parts by weight based on the weight of said polyisocyanate polyaddition product.

14. A composite structure as defined in claim 8 wherein said expanding agent comprises a chemical expanding agent.

15. A composite structure as defined in claim 14 wherein said chemical expanding agent comprises a carbamate.

16. A composite structure as defined in claim 8 wherein said expanding agent comprises a physical expanding agent.

17. A composite structure as defined in claim 8 wherein said (ii) polyisocyanate polyaddition product is in contact with both said (i) and (iii).

\* \* \* \* \*